United States Patent [19]

Meisberger

[11] Patent Number: 6,062,078
[45] Date of Patent: May 16, 2000

[54] DEVICE FOR DETECTING AN UNBALANCE IN A ROTOR OF A CENTRIFUGE

[75] Inventor: Artur Meisberger, St. Wendel, Germany

[73] Assignee: Fresenius AG, Bad Homburg, Germany

[21] Appl. No.: 09/008,683

[22] Filed: Jan. 16, 1998

[30] Foreign Application Priority Data

Jan. 17, 1997 [DE] Germany ............................ 197 01 551

[51] Int. Cl.⁷ ..................................................... G01M 1/16
[52] U.S. Cl. ................................................. 73/462; 73/1.87
[58] Field of Search ........................... 73/462, 66, 514.34, 73/1.84, 460, 1.87; 210/144, 360.1, 512.1; 324/207.11

[56] References Cited

U.S. PATENT DOCUMENTS

| | | | |
|---|---|---|---|
| 3,365,934 | 1/1968 | Holz et al. | 73/462 |
| 3,422,957 | 1/1969 | Fosler | 210/144 |
| 4,214,179 | 7/1980 | Jacobson et al. | 310/68 B |
| 4,491,019 | 1/1985 | Wicki et al. | 73/457 |
| 4,972,110 | 11/1990 | Gorodissky et al. | 310/68 E |
| 5,659,136 | 8/1997 | Koch et al. | 73/462 |

FOREIGN PATENT DOCUMENTS 7024362  1/1995  Japan.

OTHER PUBLICATIONS

Abstract of 2,619,214 FR.
Abstract of 412,885 EP.

*Primary Examiner*—Hezron Williams
*Assistant Examiner*—Richard Moller
*Attorney, Agent, or Firm*—Kenyon & Kenyon

[57] ABSTRACT

The invention relates to an unbalance detector, such as for a centrifuge. The invention preferably comprises a pressure-sensitive static sensor, preferably in the form of a piezoelectric cable, which preferably is mounted on a stationary casing part and delivers an imbalance signal when it comes in mechanical contact with the rotor which has been deflected because of an imbalance. As an alternative, the sensor can also be mounted on the rotor and deliver the unbalance signal on coming in mechanical contact with the stationary casing part. According to another embodiment of the invention, the analysis stage for the unbalance signal has a test stage or simulation stage for testing the functionality of the unbalance detector.

14 Claims, 2 Drawing Sheets

DEVICE FOR DETECTING AN UNBALANCE IN A ROTOR OF A CENTRIFUGE

FIELD OF THE INVENTION

The invention relates to a device for detecting an unbalance in a rotor of a centrifuge mounted to rotate inside a casing.

BACKGROUND OF THE INVENTION

When the rotor in a centrifuge, e.g., a laboratory centrifuge or a blood centrifuge, is driven at relatively high speeds, such speeds can, if there is an unbalance, lead to violent vibration of rotor and drive. Therefore, to prevent damage to centrifuges, they are usually equipped with an unbalance detector to shut down the centrifuge on reaching a preselected unbalance threshold.

Unbalance detectors are based in principle on the fact that out-of-balance equipment parts move relative to one another, because the rotating parts are usually mounted on a carrier plate and are spring-mounted relative to the casing or have an elastic drive spindle. Equipment parts then come in contact when the unbalance becomes great enough. If an appropriate sensor is placed at the points of contact, it can detect an unbalance and send a signal via an analysis stage.

The state of the art has a number of unbalance detectors for centrifuges that operate according to this principle and differ mainly in the type of sensor technology.

For example, U.S. Pat. No. 4,491,019 concerns a device for detecting an unbalance in a rotor of a centrifuge, where a stationary magnetic field sensor and a permanent magnet are mounted on the flat part connected to the casing. The rotor has an annular flange made of soft iron opposite the flat stationary part with the permanent magnet, forming a narrow air gap. The magnetic field sensor is arranged so that it responds to changes in field in the air gap due to out-of-balance movements.

This known embodiment is very expensive and can be used economically only for special individual solutions. Because of the narrow air gap, it is also very sensitive to dirt and therefore is not sturdy enough for use under rough conditions. The very narrow air gap also causes a very high display sensitivity, because even very slight unbalances are detected. This extremely high display sensitivity is required with very special applications such as an ultracentrifuge, but it is normally undesirable.

U.S. Pat. No. 4,214,179 discloses a device for detecting an unbalance in a rotor of a centrifuge having as the sensor a rotating, electrically conducting ring concentrically surrounding the drive spindle of the rotor. With a predetermined deflection of the drive spindle due to vibration which occurs with an unbalance, the drive spindle comes in mechanical contact and thus also electrical contact with the ring, thus closing the circuit, and the electric signal derived from this is used to stop the centrifuge drive.

The main disadvantage of this known device is that it needs a sliding contact between the rotating contact ring and a stationary ring for the power supply, which is subject to high wear and is also very susceptible to dirt. Moreover, with this known device, parts of the centrifuge are energized, which is undesirable in certain applications, e.g., in the medical area, because it could endanger the safety of the operating personnel.

U.S. Pat. No. 4,972,110 discloses a device for detecting an unbalance in a rotor of a centrifuge with an adjustable optical sensor consisting of a radiation source and a radiation receiver which are arranged primarily tangentially to the mounting surface of the drive casing. Out-of-balance vibration of the rotor alters the amount of radiation striking the radiation receiver, which can be used to derive a cut-off signal for the drive. This known photoelectric release has the disadvantages of being relatively expensive, very sensitive in its display and susceptible to soiling.

U.S. Pat. No. 3,422,957 discloses a device for detecting an unbalance in the rotor of a washing machine drum or centrifugal drum with a vertical drive axis having as its sensors an arrangement of microswitches which are activated by an excessive deflection of the rotor due to an unbalance in the washing machine drum and then deliver a cut-off signal for the drive motor.

This known device has the particular disadvantage that it is susceptible to faults, not least of all because of the moving switch parts.

OBJECTS AND SUMMARY OF THE INVENTION

An object of the invention is to make available a device for detecting an unbalance in a rotor of a centrifuge which has a simple design, and is thus cost-effective to manufacture, and nevertheless is highly reliable, i.e., it operates reliably, even under rough conditions.

These and other objects are achieved according to this invention by a pressure-sensitive static sensor which delivers an out-of-balance signal when the rotor comes in mechanical contact with a stationary part of the casing. According to one aspect of the invention the device has at least one sensor which responds to changes in distance between the rotor and a stationary part of a centrifuge casing which surrounds it concentrically, generates a signal indicating the unbalance, and transmits the signal to an analysis stage of the device.

The invention advantageously creates a very sturdy, cost-effective, testable and thus reliable imbalance detector for a centrifuge. In comparison with known unbalance detectors, the devices of the invention are relatively insensitive to soiling, take up minimal space, and are economical and less susceptible to faulty triggering.

The sensor preferably is mounted on the stationary casing part, which is advantageous because of the stationary parts. However, it is essentially also conceivable for the sensor to be mounted on the rotor.

According to another embodiment of the invention, special advantages are achieved when the sensor is a piezoelectric cable which is installed along the peripheral end face of the stationary casing part over at least half of its circumference.

Such a cable can be mounted in an especially simple and space-saving manner and is relatively unsusceptible to faults.

The same thing is true when, according to another embodiment of the invention, the sensor is a piezoelectric film which is installed over at least half the circumference along the peripheral end face of the stationary casing part.

The use of piezoelectric sensors in unbalance detectors is known from the state of the art (French Patent No. 2,619, 214) cited in European Patent 412,885 A1 for balancing machines for the wheels of passenger vehicles. With these balancing machines, it is important to detect the extent of unbalance and its location. To detect the extent of unbalance, the aforementioned state of the art provides rod-shaped piezoelectric elements which are mechanically mounted between the shaft suspension and a pipe surrounding the horizontal drive shaft on which the wheels to be balanced are mounted. The piezoelectric elements fit snugly on the pipe and detect the vibrations occurring due to an unbalance, the amplitude of which is larger, the greater the unbalance, and the location of which is detected by a potentiometric arrangement.

In the known case, however, unlike the case involving centrifuges, the goal is not to detect the critical lateral deflection of a rotor shaft which reacts flexibly to an unbalance in its vertical position due to contact with a piezoelectric element but instead to determine the amplitude of vibrations. The known teaching is thus limited to the specific conditions associated with a balancing machine for the wheels of passenger vehicles and cannot be applied to centrifuges.

In another embodiment of the invention, a test circuit for testing the functioning of unbalance detectors is provided. This measure greatly increases the operating reliability, which is of great importance, especially with high-speed centrifuges.

In the simplest case, the test circuit may consist of the fact that a test pulse for testing the functionality of the analysis stage can be applied to another input of the analysis stage.

According to another embodiment of the invention, it is advantageously possible to test the entire system, including the pressure-sensitive sensor, by providing a simulation circuit consisting of a test pressure transmitter mounted on the pressure-sensitive static sensor, and when an electric test signal is applied, it generates a pressure pulse whose system response is compared with a set point in a test section of the analysis stage.

Additional design features and advantages of the invention are derived on the basis of the description of embodiments illustrated in the figures.

DETAILED DESCRIPTION OF THE PREFERRED EMBODIMENTS

Figure 1:
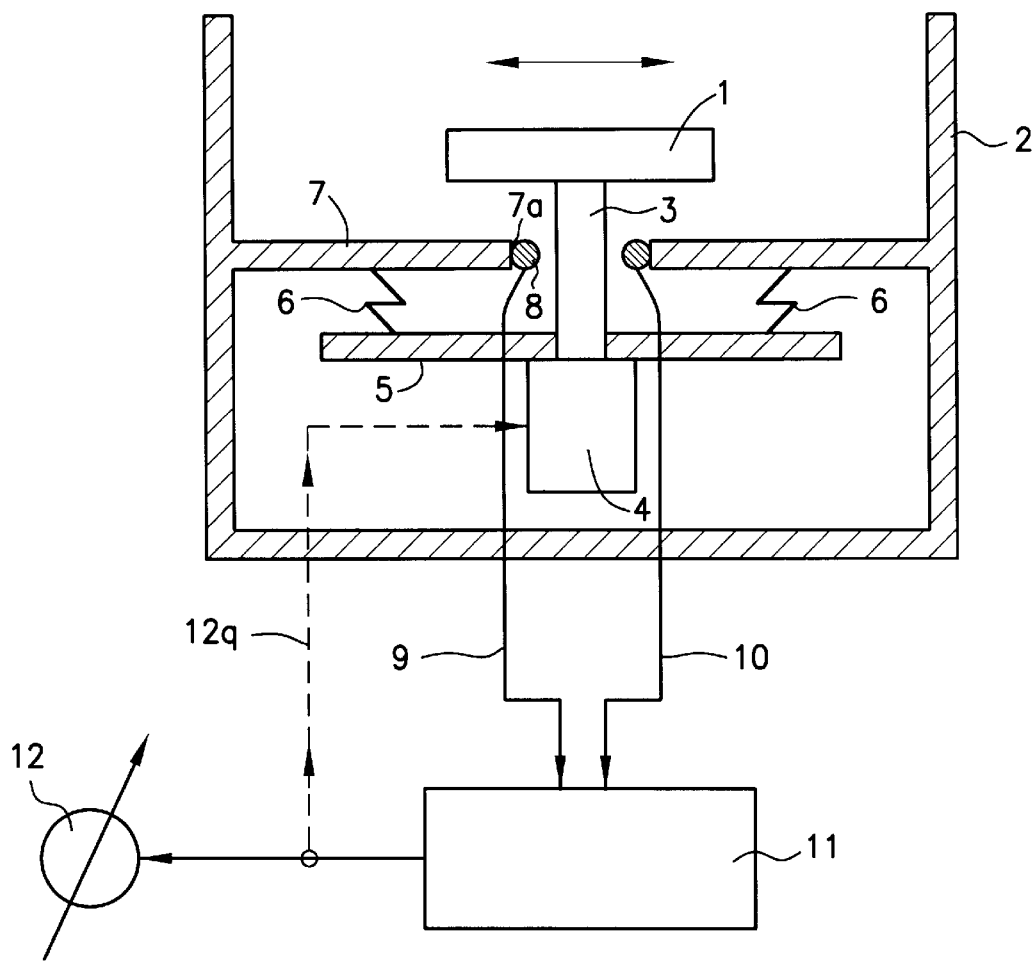
FIG. 1 is a schematic diagram of a preferred embodiment of the unbalance detector according to this invention.

FIG. 1 shows a device for detecting an unbalance in a rotor 1 of a centrifuge, e.g., a blood centrifuge, having a casing 2. Rotor 1 is driven by a motor 4 via a rigid rotor shaft 3. The rotor-motor drive unit 1, 3, 4 is mounted on a carrier plate 5 suspended in an elastic manner by means of springs 6 on an annular casing part 7 projecting inwardly from the outer casing wall.

When rotor 1 is driven at high speeds, it vibrates when out of balance because of its elastic suspension, with a lateral deflection of the rigid rotor shaft 3 corresponding to the direction of the arrows shown above rotor 1. As the imbalance becomes greater, the amplitude of the deflection of the shaft 3 increases. At a certain amplitude, rotor shaft 3 comes in contact with end face 7a of the projecting casing part 7. The distance between end face 7a and rotor shaft 3 at rest is such that deflection of the rotor shaft is not critical until rotor shaft 3 comes in contact with end face 7a.

Therefore, in the area of the circumferential end face 7a of projecting casing part 7, the invention provides for a pressure-sensitive sensor 8 which responds to the more or less impact-like mechanical contact with rotor shaft 3 and delivers an electric signal over lines 9, 10 to an analysis stage 11, which is linked to an acoustic or optical alarm generator with an unbalance display device 12. The output of analysis stage 11 is connected to a power supply for drive 4 over a line 12a, so that power can be cut off when rotor shaft 3 comes in contact with pressure-sensitive sensor 8.

Pressure-sensitive sensor 8 is preferably a commercially available flexible piezoelectric sensor cable which is installed along the periphery of end face 7a, as shown in FIG. 1. This cable need not necessarily cover the entire circumference of peripheral end face 7a. It is sufficient for the cable to extend over a portion of the circumference, preferably half.

The piezoelectric sensor cable is comprised of, in known manner, a central internal core electrode, an elastic piezoelectric rubber applied to the electrode, with a concentric ground electrode made of a flexible conductive lead extending around it, and an outer protective plastic sheathing. When the cable is exposed to mechanical pressure, an electric potential develops between the core electrode and the ground and can be analyzed as an indication of the occurrence of a pressure.

Although the arrangement of the piezoelectric sensor cable is a preferred embodiment, in an alternative embodiment end face 7a is lined with a piezoelectric film, to detect contact between rotor shaft 3 and end face 7a as an electric signal.

Figure 3:
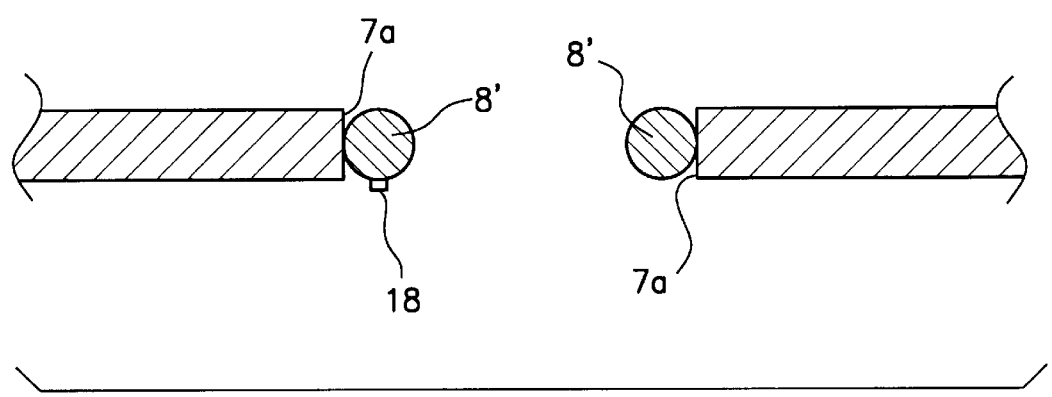
FIG. 3 shows in cross-section an air-filled hose and converter for use as a pressure sensor.

In principle, it is possible in accordance with the invention to also use pressure-sensitive sensors which are not based on a piezoelectric effect. Thus, for example as shown in FIG. 3, end face 7a can be lined with a self-contained, air-filled measuring hose 8' integrated with a converter 18, which responds to changes in air pressure in the interior of the hose due to external impacts and delivers a suitable electric signal. The details of such pressure sensors are known to those of skill in the art.

Figure 2:
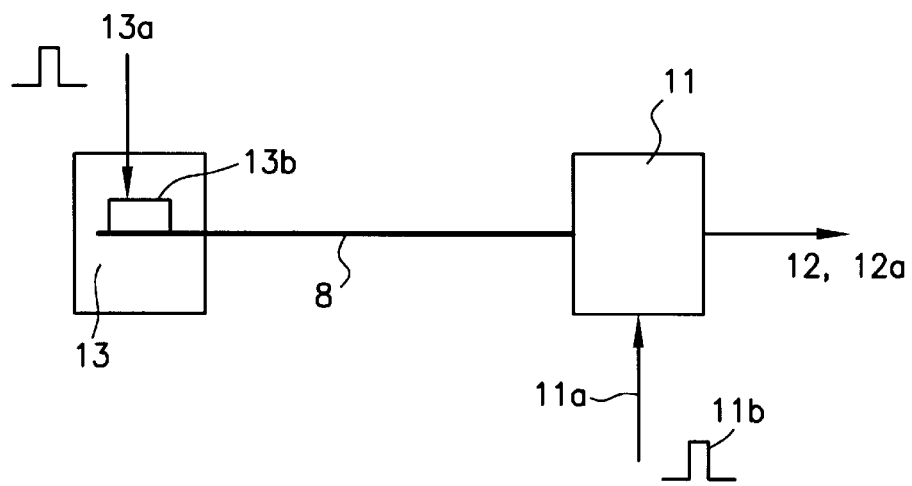
FIG. 2 is a test circuit for testing the functionality of the unbalance detector.

The present invention also offers a simple mechanism for testing the functionality of an imbalance detector, such as that shown in FIG. 1. Such testing can be especially important for reliable operation of the devices of the invention. FIG. 2, which shows a detail of FIG. 1 with an analysis stage 11, illustrates how the functionality of the system can be tested.

For isolated testing of the analysis stage, a test pulse 11b can be generated by a known generator, which simulates a pressure pulse which occurs when rotor shaft 3 comes in contact with sensor cable 8. Test pulse 11b can be applied to an input 11a. With this test pulse 11b, it is possible to test whether analysis stage 11 is responding in the intended manner.

However, it is also possible to test the entire system, including sensor cable 8. For this purpose, a simulation stage 13 for simulating an unbalance is provided according to FIG. 2.

This stage preferably consists of a piezoelectric test generator 13b, which is preferably applied in a layer to a small area of sensor cable 8 (FIG. 2 shows sensor cable 8 of FIG. 1 in a developed view) and can be driven electrically from the outside. When an electric test signal 13a is applied, test pressure generator 13b experiences a mechanical change which is manifested as a pressure signal on sensor cable 8, i.e., it simulates a rotor contact signal. The system response is compared with a set point at full functionality in a test section of analysis stage 11. In this way, it is possible to ascertain very advantageously whether the entire system of the unbalance detector is fully functional.

What is claimed is:

1. A device for detecting an unbalance in a rotor, comprising a stationary casing positioned such that the rotor is capable of contacting the casing when unbalanced, and at least one pressure sensitive sensor disposed on at least one of the rotor and the casing so as to be contacted by the rotor when the rotor reaches a degree of imbalance such that the rotor, sensor and casing come into contact, wherein the pressure-sensitive sensor is constructed to emit a signal when contacted by the rotor and casing.

2. The device of claim 1 wherein the pressure-sensitive sensor is mounted on the rotor.

3. The device of claim 1, wherein the rotor is the rotor of a centrifuge.

4. The device of claim 3 wherein the pressure-sensitive sensor is mounted over at least half the circumference of the stationary casing.

5. The device of claim 4 wherein the pressure-sensitive sensor is a piezoelectric cable.

6. The device of claim 4 wherein the pressure-sensitive sensor is piezoelectric film.

7. The device of claim 1 wherein the pressure-sensitive sensor is an air-filled hose.

8. The device of claim 7 further comprising a converter that responds to a change in air pressure within the air-filled hose by generating an electrical signal.

9. The device of claim 3 further comprising an analysis stage to which an electrical signal is transmitted from the pressure-sensitive sensor.

10. The device of claim 9 wherein the analysis stage is adapted to cut off power to the rotor in response to an electrical signal.

11. A method for detecting an imbalance in a rotor, comprising:
 a) providing a rotor which will deflect laterally when imbalanced;
 b) providing a casing which is stationary relative to the rotor, positioned such that the rotor is capable of contacting the casing when sufficiently imbalanced;
 c) providing at least one pressure-sensitive sensor on at least one of the rotor and casing, such that a pressure is applied to the sensor upon contact by the rotor and the casing; and
 d) generating a signal in response to application of pressure to the sensor.

12. A method according to claim 11, further comprising cutting off power to the rotor in response to generation of the signal from the sensor.

13. A device for detecting an imbalance in a rotor of a centrifuge comprising:
 a) a stationary casing positioned such that the rotor is capable of contacting the casing when imbalanced;
 b) at least one pressure-sensitive sensor associated with at least one of the rotor and the casing and constructed and arranged to be contacted by the rotor when the rotor reaches a degree of imbalance such that the rotor, sensor and casing come into contact;
 c) an analysis stage connected to the pressure-sensitive sensor such that an electrical signal can be transmitted to the analysis stage from the sensor; and
 d) a test circuit for testing the functionality of the analysis stage, which conducts an electrical impulse to an input of the analysis stage;

wherein the pressure-sensitive sensor is constructed to emit a signal to the analysis stage when contacted by the rotor and casing.

14. A device for detecting an imbalance in a rotor of a centrifuge comprising:
 a) a stationary casing positioned such that the rotor is capable of contacting the casing when imbalanced;
 b) at least one pressure-sensitive sensor associated with at least one of the rotor and the casing and constructed and arranged to be contacted by the rotor when the rotor reaches a degree of imbalance such that the rotor, sensor and casing come into contact;
 c) an analysis stage connected to the pressure-sensitive sensor such that an electrical signal can be transmitted to the analysis stage from the sensor; and
 d) a simulation circuit comprising a test pressure generator connected to the pressure-sensitive sensor, the pressure generator constructed and arranged to generate a pressure pulse in response to an electric signal, the pressure pulse causing the pressure-sensitive sensor to emit an electrical signal to the analysis stage to test the response of the device to an imbalance;

wherein the pressure-sensitive sensor is constructed to emit a signal to the analysis stage when contacted by the rotor and casing.

* * * * *